United States Patent
Goodsitt et al.

(10) Patent No.: US 11,599,717 B2
(45) Date of Patent: Mar. 7, 2023

(54) SEPARATELY COLLECTING AND STORING FORM CONTENTS

(71) Applicant: Capital One Services, LLC, McLean, VA (US)

(72) Inventors: Jeremy Goodsitt, Champaign, IL (US); Austin Walters, Savoy, IL (US); Galen Rafferty, Mahomet, IL (US); Anh Truong, Champaign, IL (US); Mark Watson, Urbana, IL (US); Reza Farivar, Champaign, IL (US); Vincent Pham, Champaign, IL (US)

(73) Assignee: Capital One Services, LLC, McLean, VA (US)

(*) Notice: Subject to any disclaimer, the term of this patent is extended or adjusted under 35 U.S.C. 154(b) by 209 days.

(21) Appl. No.: 16/824,804

(22) Filed: Mar. 20, 2020

(65) Prior Publication Data

US 2021/0294967 A1     Sep. 23, 2021

(51) Int. Cl.
| | |
|---|---|
| *G06F 3/048* | (2013.01) |
| *G06F 40/174* | (2020.01) |
| *G06F 21/32* | (2013.01) |
| *G06V 30/414* | (2022.01) |
| *G06V 30/416* | (2022.01) |

(52) U.S. Cl.
CPC ............ *G06F 40/174* (2020.01); *G06F 21/32* (2013.01); *G06V 30/414* (2022.01); *G06V 30/416* (2022.01)

(58) Field of Classification Search
CPC ........ G06F 40/174; G06F 21/32; G06F 21/31; G06F 21/6245; G06F 3/011; G06F 3/013; G06F 3/0488; G06F 3/04842; G06F 3/04883; G06F 3/0482; G06F 3/04815; G06F 1/163; G06F 3/04845; G06F 16/00; G06F 3/04817; G06F 3/0346; G06F 16/54; G06F 3/0484; G06F 3/012; G06K 9/00463; G06K 9/00469; G06K 9/00671; G06T 19/006; G06T 19/20; G06T 11/60; G06T 2200/24

See application file for complete search history.

(56) References Cited

U.S. PATENT DOCUMENTS

| | | | |
|---|---|---|---|
| 6,529,209 B1* | 3/2003 | Dunn | H04N 13/398 345/629 |
| 7,253,791 B2* | 8/2007 | Kahan | G09C 5/00 345/8 |
| 8,214,362 B1* | 7/2012 | Djabarov | G06F 40/174 707/736 |

(Continued)

*Primary Examiner* — Steven B Theriault
(74) *Attorney, Agent, or Firm* — Banner & Witcoff, Ltd.

(57) ABSTRACT

Apparatuses, systems and methods are described herein for separately collecting and storing form contents. Different information may be collected from a user on a form. Based on determining that portions of the form request private information, an extended reality (XR) environment may be provided to the user. The user may provide private information via an input method in the XR environment. The user may provide non-private information using a different input method outside of the XR environment. The private information may be processed and stored in a different database as compared to the non-private information. The database storing private information may have a higher security standard than the database storing non-private information.

20 Claims, 4 Drawing Sheets

(56) References Cited

U.S. PATENT DOCUMENTS

| | | | |
|---|---|---|---|
| 8,217,856 B1* | 7/2012 | Petrou | G06F 3/03547 |
| | | | 345/8 |
| 8,539,560 B2* | 9/2013 | Angaluri | G06F 21/84 |
| | | | 726/6 |
| 8,856,948 B1* | 10/2014 | Robison | G06F 21/32 |
| | | | 726/26 |
| 8,878,750 B1* | 11/2014 | Park | G06K 9/00221 |
| | | | 345/8 |
| 9,058,813 B1* | 6/2015 | Blanksteen | G06F 40/279 |
| 9,098,481 B2* | 8/2015 | Gwozdz | G06F 40/174 |
| 9,288,211 B2* | 3/2016 | Arning | G06F 21/6227 |
| 9,563,778 B2* | 2/2017 | Sibert | G06F 21/83 |
| 9,565,176 B2* | 2/2017 | Goyal | G06F 3/14 |
| 9,665,697 B2* | 5/2017 | Bostick | G06F 21/84 |
| 9,682,590 B1* | 6/2017 | Ramarao | G06F 3/1288 |
| 9,760,696 B2* | 9/2017 | Chen | G06F 21/42 |
| 9,767,585 B1* | 9/2017 | Carter, Jr. | G06T 19/00 |
| 9,805,511 B2 | 10/2017 | Hintermeister et al. | |
| 10,013,411 B2* | 7/2018 | Sherry | G06F 40/117 |
| 10,043,033 B1* | 8/2018 | Hadsall | G06F 21/6245 |
| 10,078,867 B1 | 9/2018 | Chan et al. | |
| 10,229,100 B1* | 3/2019 | Lesner | G06T 11/00 |
| 10,261,979 B2* | 4/2019 | Nikitin | G06F 40/103 |
| 10,360,628 B1* | 7/2019 | Carter, Jr. | G06T 11/60 |
| 10,454,906 B1* | 10/2019 | Sharfman | G06F 21/602 |
| 10,482,664 B1 | 11/2019 | Schlosser et al. | |
| 10,504,289 B2* | 12/2019 | Yildiz | G06T 1/0021 |
| 10,528,838 B1* | 1/2020 | Carter, Jr. | G06Q 20/3276 |
| 10,534,954 B2* | 1/2020 | Kaehler | G06K 9/00671 |
| 10,671,752 B1* | 6/2020 | Misra | G06F 21/6227 |
| 10,699,145 B1* | 6/2020 | Bertrand | G06K 9/00483 |
| 10,776,571 B2* | 9/2020 | Meschkat | G06Q 30/0633 |
| 10,783,269 B1* | 9/2020 | Shraer | H04L 9/3242 |
| 10,853,526 B2* | 12/2020 | Li | G06F 21/6245 |
| 10,957,107 B2* | 3/2021 | Verma | G06T 11/40 |
| 10,990,751 B2* | 4/2021 | Van Rotterdam | G06F 40/186 |
| 11,093,899 B2* | 8/2021 | Punzalan | G06K 9/00671 |
| 11,100,467 B2* | 8/2021 | Ponnavaikko | G06Q 10/10 |
| 11,308,266 B1* | 4/2022 | Estrada Diaz | G06F 40/174 |
| 2002/0111920 A1* | 8/2002 | Tresser | G06Q 30/02 |
| | | | 705/74 |
| 2005/0251865 A1* | 11/2005 | Mont | H04L 9/3073 |
| | | | 726/26 |
| 2006/0007189 A1* | 1/2006 | Gaines, III | G06K 9/222 |
| | | | 345/179 |
| 2006/0026042 A1* | 2/2006 | Awaraji | H04L 63/10 |
| | | | 705/3 |
| 2007/0133876 A1* | 6/2007 | Chande | G06F 40/174 |
| | | | 382/181 |
| 2009/0273562 A1* | 11/2009 | Baliga | G06F 3/013 |
| | | | 345/157 |
| 2010/0177035 A1* | 7/2010 | Schowengerdt | G06F 1/163 |
| | | | 345/156 |
| 2010/0192076 A1* | 7/2010 | Eischeid | G06F 40/174 |
| | | | 715/764 |
| 2011/0314046 A1* | 12/2011 | Burckart | G06F 16/958 |
| | | | 715/741 |
| 2012/0131471 A1* | 5/2012 | Terlouw | G06F 3/04883 |
| | | | 715/741 |
| 2013/0272523 A1* | 10/2013 | McCorkindale | H04N 1/444 |
| | | | 380/243 |
| 2013/0307870 A1* | 11/2013 | Ashbrook | G06F 21/84 |
| | | | 345/629 |
| 2013/0318625 A1* | 11/2013 | Fan | G06F 21/62 |
| | | | 726/27 |
| 2013/0335301 A1* | 12/2013 | Wong | G06F 3/167 |
| | | | 345/8 |
| 2014/0029046 A1* | 1/2014 | Ponnavaikko | G06Q 30/0281 |
| | | | 358/1.15 |
| 2014/0040717 A1* | 2/2014 | Piratla | G06F 40/174 |
| | | | 715/221 |
| 2014/0111427 A1* | 4/2014 | Lindley | G06F 3/011 |
| | | | 345/156 |
| 2014/0123057 A1* | 5/2014 | Eigner | G06Q 30/0269 |
| | | | 715/780 |
| 2014/0188756 A1* | 7/2014 | Ponnavaikko | G06K 9/00449 |
| | | | 705/342 |
| 2014/0253412 A1* | 9/2014 | Blaich | G06F 21/60 |
| | | | 345/1.2 |
| 2014/0283100 A1* | 9/2014 | Harrison | G06F 21/6245 |
| | | | 726/26 |
| 2014/0373176 A1* | 12/2014 | Arning | G06F 16/93 |
| | | | 726/28 |
| 2015/0062159 A1* | 3/2015 | Hildreth | A63F 13/26 |
| | | | 345/633 |
| 2015/0143459 A1* | 5/2015 | Molnar | G06F 21/60 |
| | | | 726/2 |
| 2015/0200922 A1* | 7/2015 | Eschbach | G06F 40/131 |
| | | | 358/1.14 |
| 2015/0205777 A1* | 7/2015 | Campanelli | G06K 9/00449 |
| | | | 715/226 |
| 2016/0217119 A1* | 7/2016 | Dakin | G06F 40/274 |
| 2016/0269376 A1* | 9/2016 | Goyal | G02B 27/017 |
| 2016/0300231 A1* | 10/2016 | Shavell | H04W 12/02 |
| 2016/0379412 A1* | 12/2016 | Butler | G06T 19/006 |
| | | | 345/633 |
| 2017/0192950 A1* | 7/2017 | Gaither | G10L 15/22 |
| 2017/0262421 A1* | 9/2017 | Yue | H04L 63/00 |
| 2017/0351909 A1* | 12/2017 | Kaehler | G06T 19/006 |
| 2018/0053016 A1* | 2/2018 | Horesh | G06F 21/6263 |
| 2018/0075254 A1* | 3/2018 | Reid | G06F 40/205 |
| 2018/0089459 A1* | 3/2018 | Eisen | H04N 1/4486 |
| 2018/0107839 A1* | 4/2018 | Clement | G06F 3/017 |
| 2018/0150810 A1* | 5/2018 | Lee | G06Q 20/102 |
| 2018/0285592 A1* | 10/2018 | Sharifi | G06F 21/35 |
| 2019/0050592 A1* | 2/2019 | Grau | G06F 21/629 |
| 2019/0286671 A1* | 9/2019 | Vo | G06F 9/547 |
| 2019/0303411 A1* | 10/2019 | Wilson | G06V 30/412 |
| 2019/0369714 A1* | 12/2019 | Pla I. Conesa | G06F 3/011 |
| 2019/0377894 A1* | 12/2019 | Jang | G06F 9/451 |
| 2020/0125322 A1* | 4/2020 | Wilde | G06F 1/163 |
| 2020/0145424 A1* | 5/2020 | Chen | G06Q 10/063114 |
| 2020/0167712 A1* | 5/2020 | Stracquatanio | G06F 3/012 |
| 2020/0226600 A1* | 7/2020 | Cao | G06F 21/35 |
| 2020/0293680 A1* | 9/2020 | Navarro-Dimm | H04L 67/535 |
| 2020/0301552 A1* | 9/2020 | Maeng | G06F 3/0484 |
| 2020/0320479 A1* | 10/2020 | Ponnavaikko | G06Q 10/10 |
| 2021/0240331 A1* | 8/2021 | Olson | G06F 3/0487 |

\* cited by examiner

SEPARATELY COLLECTING AND STORING FORM CONTENTS

FIELD OF USE

Aspects of the disclosure relate generally to computer hardware and software that can be used to separately collect and store form contents. More specifically, aspects of the disclosure may provide apparatuses, systems, and methods for a user to fill out some fields of a form in an extended reality (XR) environment, i.e., a virtual/augmented/mixed reality (VR/AR/MR) environment, e.g., when the fields request private information.

BACKGROUND

Extended reality (XR) technology is increasingly used in many aspects of people's lives, such as gaming, learning, physical training, medical diagnosis, design, communication, etc. XR may encompass all real and virtual environments generated by computer graphics and wearables. XR may refer to virtual reality (VR), augmented reality (AR), and/or mixed reality (MR). VR may include all virtually immersive experiences. These could be created using purely real-world content (e.g., a 360° picture or video of Yosemite National Park), purely computer-generated (CG) content (e.g., a CG dragon in a gaming setup), or a hybrid of both. VR may entail use of devices like the OCULUS RIFT® sold by Facebook Technologies, LLC of Menlo Park, Calif., HTC VIVE® sold by HTC Corporation of New Taipei City, Taiwan, or GOOGLE CARDBOARD® sold by Alphabet Inc. of Mountain View, Calif. AR is an overlay of CG content on the real world. An example of an AR environment is the AR environment provided in the POKEMON GO® mobile application by Niantic Corporation of San Francisco, Calif., where a user may catch CG POKEMON characters by a landmark in a city. Another example of an AR environment is the AR environment provided in the IKEA PLACE mobile application by Inter IKEA Systems B.V. of Delft, the Netherlands, where a user may see how a CG furniture piece fits in the user's living room. In this way, the augmented content does not recognize the physical objects within a real-world environment. In other words, the CG content and the real-world content are not able to respond to one another. MR removes the boundaries between real and virtual interaction via occlusion. Occlusion means the CG objects can be visibly obscured by objects in the physical environment. For example, a virtual soldier may hide behind your closet door in a gaming setup in MR.

A user may have control over who the user may share the contents presented in an XR environment with. For example, if a user does not trust the people around them (e.g., in a room), the user may keep the contents presented in the XR environment to themselves (rather than, for example, displaying parts of the XR environment on a display). Also, data stored during XR activities may be secure in certain circumstances. XR technology providers may configure XR environments in a manner where certain data (e.g., user movements) is not stored, but other data (e.g., chat logs) may be stored (e.g., for marketing purposes).

Maintaining privacy in circumstances where users fill out forms with private information is often critical. Traditional ways of filling out forms such as on a computer screen or on printed paper might not defend against peeking from people sitting/standing around the user. Evidence of previously filled-out forms, such as electronic/paper copies of private information, can expose users' private information to theft. As such, there is a strong need for improvements in the ways in which users input and submit private information to form collectors.

Aspects described herein may address these and other problems, and generally improve the security of collecting and storing form contents.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for apparatuses, systems, and methods for separately collecting and storing form contents. This may improve security during the entry of information, such as private information, into a form, such as a paper or electronic form. These and other benefits may be achieved by collecting data for some fields of a form in an XR environment, while collecting data for other fields of the form outside of the XR environment. After an XR device may acquire a form such as by looking up a form in a forms database based on a captured bar code, the XR device may discern what fields request private information and what fields request non-private information. For the fields that request private information, the XR device may present the fields in an XR environment to a user, where the user may enter information in the protected XR environment. For other fields that request non-private information, the user may continue to fill out them in a traditional way, such as on a computer screen or on printed paper. The data that correspond to private information may be stored in a database with added encryption. The data that correspond to non-private information may be stored in a database with standard encryption. By collecting and storing form contents differently, private information may be provided with added protection.

Some aspects described herein may provide a computer-implemented method for separately collecting and storing form contents. A camera of an XR device may capture a portion of a form, such as a bar code, a form number, a form name, etc. The form may be acquired by the XR device, such as by retrieving the form from a forms database based on the bar code, the form name, or the form number. A location of the XR device may be determined, and forms may be retrieved based on the location. The XR device may determine that some fields of the form request private information from a user, while other fields of the form only request non-private information from the user. For the fields that request private information, the XR device may provide an XR environment to the user. Additionally, and/or alternatively, a computing device associated with the XR device may provide to the user the XR environment. The XR device may display a representation of the form in the XR environment, which in some cases may display fields that request private information. The XR device may receive, from the user, data corresponding to the fields of the form that request private information. The reception of the data may be via an input method in the XR environment, such as typing on a virtual keyboard presented in the XR environment, checking a box presented in the XR environment, and/or using a finger or a virtual pen. For fields that request non-private information, the user may provide data via a different input method outside of the XR environment. Before receiving data from the user, the XR device may perform an authorization check on the user to make sure the user is authorized to fill out the form and/or make changes to the form contents. The data corresponding to private information may be stored in a first database. The XR device may obscure the data stored in the first database and may display that data in the XR environment after receiving a request from the user. The data for the other fields may be stored in a second database. The first database and second database may have different storage and/or encryption schemes. After the data is stored, the user may be prompted to destroy the form.

These features, along with many others, are discussed in greater detail below.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for separately collecting, in and outside of an extended reality (XR) environment, and storing form contents during information collection using a form.

Conventional form-filling processes, such as allowing users to fill out a paper form or enter their information into an electronic form using an input device such as a keyboard, have numerous limitations. Specifically, during entry of private information (e.g., personally identifiable information, or PII), theft of the private information may be effectuated by, for example, acquiring a copy of the paper form, photographing the paper form, intercepting signals from the keyboard, or even looking over the shoulder of the user filling out the form. Forms, such as log-in forms, may be implemented in XR environments; however, such forms are rudimentary at best, and generally use the same flawed input schema used outside of the XR environments.

Separately collecting private information in XR environments may overcome the abovementioned limitations. The XR-enabled form-filling systems may improve the functioning of computers by improving the security and flexibility with which computing devices receive and manage private information. In the XR environment, a user may have more control over who they may share the information with and what part of the information they may share. For example, if the user trusts the people around them, they may cast the contents presented in their XR environment to a display device for everyone to see. The user may selectively cast certain parts of the form contents instead of all of the form contents depending on information sensitivity. If the user does not trust the people around them, they may enter private information under the protection of the XR headset and environment. It may be more difficult for bystanders to peek at their form contents. By using a unique implementation of XR environments, the present system may allow users to conveniently input information into forms while benefit from the privacy and security improvements which may be implemented in an XR environment. XR technology providers may commonly use the most advanced encryption and security standards in collecting and storing XR data. There may be always a risk in collecting, storing, and sharing data, however, the present disclosure is a significant improvement over inputting data using traditional manual input stationaries and/or computing device input devices.

Before discussing these concepts in greater detail, however, an illustrative computing device will first be discussed with respect to FIG. 1. The computing device may be used to implement one or more illustrative aspects discussed herein (e.g., providing and/or retrieving a digital form, storing data as a database, connecting with an XR device and providing an XR environment, etc.). An illustrative XR device will be discussed with respect to FIG. 2.

Figure 1:
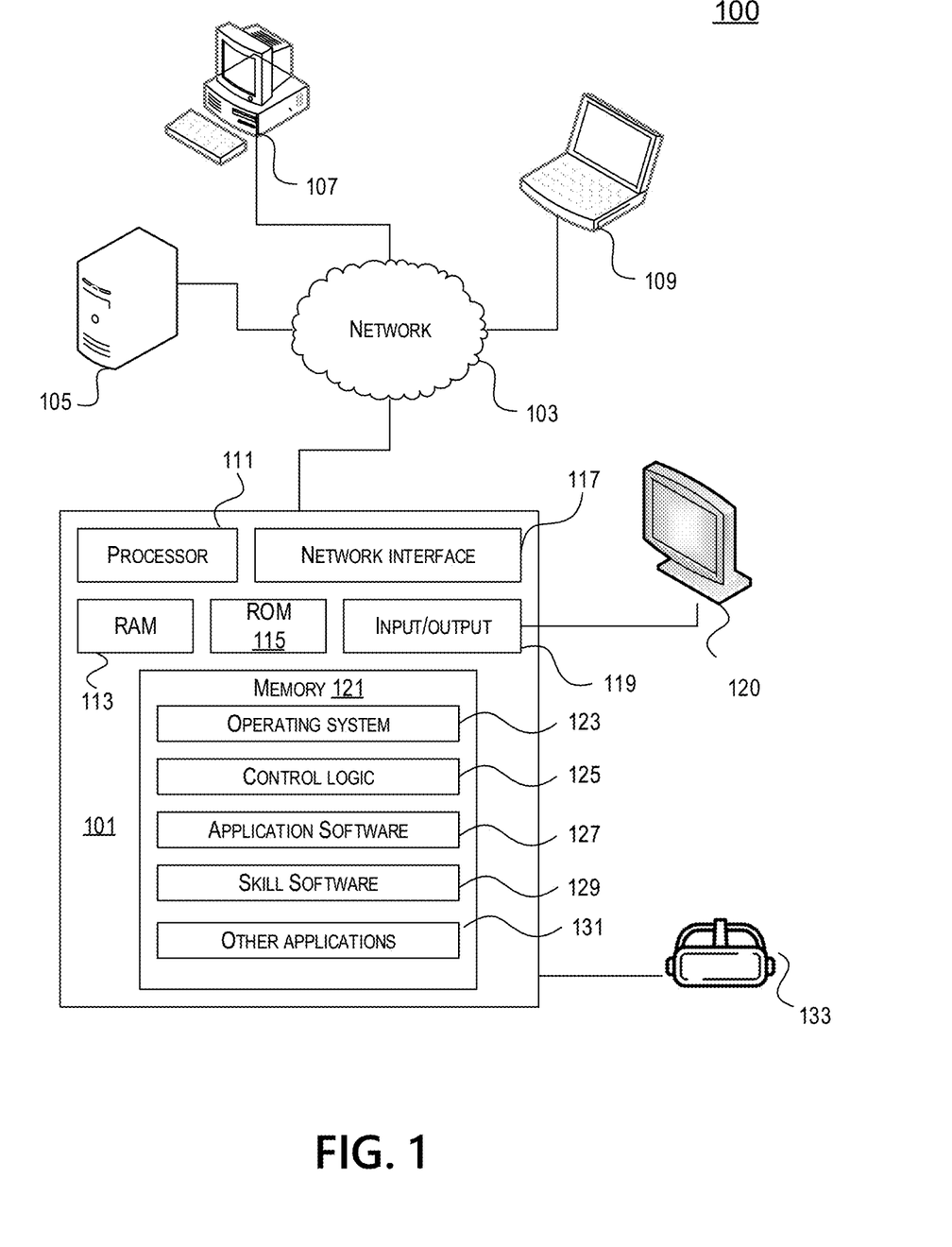
FIG. 1 depicts an illustrative computing device that may be used to implement one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

Also as shown in FIG. 1, an XR device 133 may be connected to the computing device 101 via, e.g., a USB cable, a HDMI cable, an AV cable, etc. The XR device 133 may be alternatively, and/or additionally, connected to the computing device 101 via the network 103. The computing device 101 may provide all or portions of an XR environment to the XR device 133. The XR device 133 may present a representation of the XR environment to a user of the XR device 133.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, application software 127, skill software 128, and other applications 129. Control logic 125 may be incorporated in and may be a part of application software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

Figure 2:
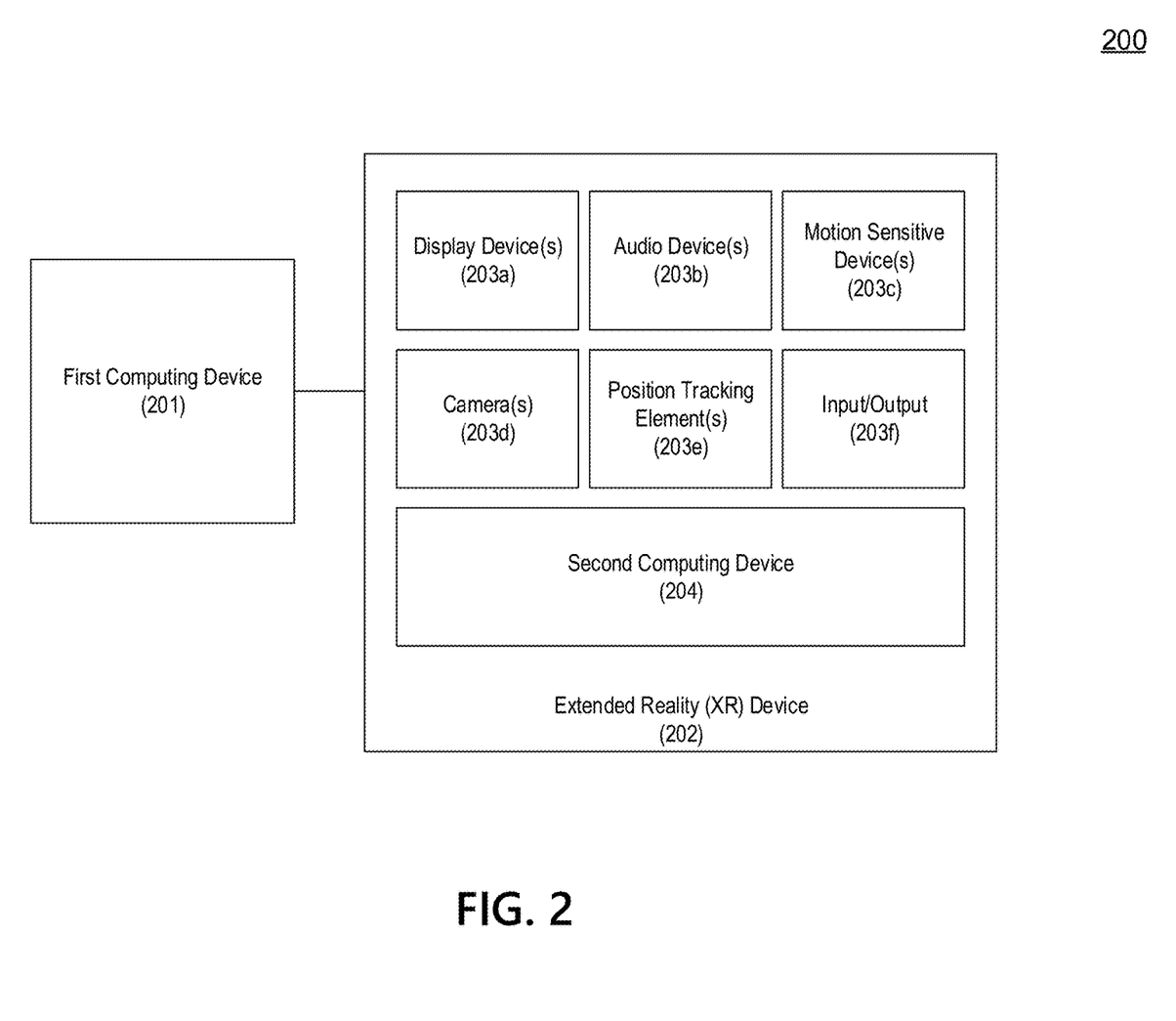
FIG. 2 depicts an illustrative extended reality (XR) device.

FIG. 2 depicts an example of an XR device 202, which may be the same or similar as the XR device 133. The XR device 202 may be configured to provide a VR, AR, and/or MR environment. The XR device 202 may be communicatively connected to a first computing device 201, which may be the same or similar as the computing device 101. The XR device 202 may comprise a plurality of different elements, such as display devices 203a, audio devices 203b, motion sensitive devices 203c, cameras 203d, position tracking elements 203e, and input/output 203f. Such elements may additionally and/or alternatively be referred to as sensors. Other such elements, not shown, may include in-ear electroencephalographic (EEG) and/or heart rate variability (HRV) measuring devices, scalp and/or forehead-based EEG and/or HRV measurement devices, eye-tracking devices (e.g., using infrared), or the like. The XR device 202 may further comprise a second computing device 204, which may be the same or similar as the computing device 101. Not all elements shown in FIG. 2 need to be present for operation of the XR device 202. For example, the XR device 202 might not have the cameras 203d. As another example, the XR device 202 might lack a second computing device 204, such that the first computing device 201 directly interfaces with the display devices 203a, the audio devices 203b, the motion sensitive devices 203c, the cameras 203d, the position tracking elements 203e, and/or the input/output 203f to provide an XR environment. As yet another example, the second computing device 204 may be sufficiently powerful enough such that the first computing device 201 may be omitted.

The first computing device 201 and/or the second computing device 204 need not have any particular processing power or functionality to provide an XR environment. The first computing device 201 and/or the second computing device 204 may comprise, for example, relatively underpowered processors which provide rudimentary video and/or audio. The first computing device 201 and/or the second computing device 204 may, for example, comprise relatively powerful processors which provide highly realistic video and/or audio.

Though described in many instances with respect to visually-based XR environments, the XR device 202 may provide audio-based XR environments. The XR device 202 need not have any of the display devices 203a, and may instead provide audio, touch, and/or scent-based environment(s). For example, the XR device 202 may provide an audio scenario in an XR environment which allows a user of the XR device 202 to practice conversation skills. As another example, the XR device 202 may provide a touch-based scenario which allows a user of the XR device 202 to practice being comfortable with unexpected touch sensations.

The XR device 202 may provide a VR, AR, and/or MR environment to the user. In general, VR environments provide an entirely virtual world, whereas AR and/or MR environments mix elements in the real world and the virtual world. The XR device 202 may be a device specifically configured to provide an XR environment (e.g., a VR headset), or may be a combination of devices (e.g., a smartphone inserted into a headset) which, when operated in a particular manner, provides an XR environment. The XR device 202 may be said to be untethered at least in part because it may lack a physical connection to another device (and, e.g., may be battery powered). If the XR device 202 is connected to another device (e.g., the first computing device 201, a power source, or the like), it may be said to be tethered. Examples of the XR device 202 may include the VALVE INDEX VR device developed by Valve Corporation of Bellevue, Wash., the OCULUS QUEST VR device sold by Facebook Technologies, LLC of Menlo Park, Calif., and the HTC VIVE® VR device sold by HTC Corporation of New Taipei City, Taiwan. Examples of the XR device 202 may also include smartphones which may be placed into a headset for VR purposes, such as the GEAR VR product sold by Samsung Group of Seoul, South Korea. Examples of the XR device 202 may also include the AR headsets sold by Magic Leap, Inc. of Plantation, Fla., the HOLOLENS® MR headsets sold by Microsoft Corporation of Redmond, Wash., and NREAL LIGHT headsets sold by Hangzhou Tairuo Technology Co., Ltd. of Beijing, China, among others. Examples of the XR device 202 may also include audio-based devices, such as the ECHO FRAMES sold by Amazon, Inc. of Seattle, Wash. All such VR devices may have different specifications. For example, some VR devices may have cameras, whereas others might not. These are merely examples, and other AR/VR systems may also or alternatively be used.

The first computing device 201 may provide all or portions of an XR environment to the XR device 202, e.g., as used by a tethered OCULUS RIFT®. For example, the first computing device 201 may provide a video data stream to the XR device 202 that, when displayed by the XR device 202 (e.g., through the display devices 203a), shows a virtual world. Such a configuration may be advantageous where the XR device 202 (e.g., the second computing device 204 that is part of the XR device 202) is not powerful enough to display a full XR environment. The first computing device 201 need not be present for the XR device 202 to provide an XR environment. For example, where the second computing device 204 is sufficiently powerful, the first computing device 201 may be omitted, e.g., an untethered OCULUS QUEST.

The display devices 203a may be any devices configured to display all or portions of an XR environment. Such display devices 203a may comprise, for example, flat panel displays, such as one or more liquid-crystal display (LCD) panels. The display devices 203a may be the same or similar as the display 106. The display devices 203a may be singular or plural, and may be configured to display different images to different eyes of a user. For example, the display devices 203a may comprise one or more display devices coupled with lenses (e.g., Fresnel lenses) which separate all or portions of the displays for viewing by different eyes of a user.

The audio devices 203b may be any devices which may receive and/or output audio associated with an XR environment. For example, the audio devices 203b may comprise speakers which direct audio towards the ears of a user. As another example, the audio devices 203b may comprise one or more microphones which receive voice input from a user. The audio devices 203b may be used to provide an audio-based XR environment to a user of the XR device 202.

The motion sensitive devices 203c may be any elements which receive input related to the motion of a user of the XR device 202. For example, the motion sensitive devices 203c may comprise one or more accelerometers which may determine when a user of the XR device 202 is moving (e.g., leaning, moving forward, moving backwards, turning, or the like). Three dimensional accelerometers and/or gyroscopes may be used to determine full motion of the XR device 202. Optional external facing cameras 203d may be used for 3D orientation as well. The motion sensitive devices 203c may permit the XR device 202 to present an XR environment which changes based on the motion of a user.

The cameras 203d may be used to aid in the safety of the user as well as the presentation of an XR environment. The cameras 203d may be used to monitor the surroundings of a user so as to avoid the user inadvertently contacting elements (e.g., walls) in the real world. The cameras 203d may additionally and/or alternatively monitor the user (e.g., the eyes of the user, the focus of the user's eyes, the pupil dilation of the user, or the like) to determine which elements of an XR environment to render, the movement of the user in such an environment, or the like.

The position tracking elements 203e may be any elements configured to aid in the tracking of the position and/or movement of the XR device 202. The position tracking elements 203e may be all or portions of a system of infrared emitters which, when monitored by a sensor, indicate the position of the XR device 202 (e.g., the position of the XR device 202 in a room). The position tracking elements 203e may be configured to permit "inside-out" tracking, where the XR device 202 tracks the position of one or more elements (e.g., the XR device 202 itself, a user's hands, external controllers, or the like) or "outside-in" tracking, where external devices aid in tracking the position of the one or more elements.

The input/output 203f may be configured to receive and transmit data associated with an XR environment. For example, the input/output 203f may be configured to communicate data associated with movement of a user to the first computing device 201. As another example, the input/output 203f may be configured to receive information associated with other users of a massively multiplayer XR environment.

The second computing device 204 may be configured to provide, via the display devices 203a, the audio devices 203b, the motion sensitive devices 203c, the cameras 203d, the position tracking elements 203e, and/or the input/output 203f, the XR environment. The second computing device 204 may comprise one or more processors (e.g., a graphics processor), storage (e.g., that stores virtual reality programs), or the like. In general, the second computing device 204 may be powerful enough to provide the XR environment without using the first computing device 201, such that the first computing device 201 need not be required and need not be connected to the XR device 202. In other configurations, the second computing device 204 and the first computing device 201 may work in tandem to provide the XR environment. In other configurations, the XR device 202 might not have the second computing device 204, such that the first computing device 201 interfaces with the display devices 203a, the audio devices 203b, the motion sensitive devices 203c, the cameras 203d, the position tracking elements 203e, and/or the input/output 203f directly.

The above-identified elements of the XR device 202 are merely examples. The XR device 202 may have more or similar elements. For example, the XR device 202 may include in-ear EEG and/or HRV measuring devices, scalp and/or forehead-based EEG and/or HRV measurement devices, eye-tracking devices (e.g., using cameras directed at users' eyes, pupil tracking, infrared), or the like.

Having discussed several examples of computing devices and XR devices which may be used to implement some aspects as discussed further below, discussion will now turn to apparatuses, systems, and methods for separately collecting and storing form contents.

Figure 3:
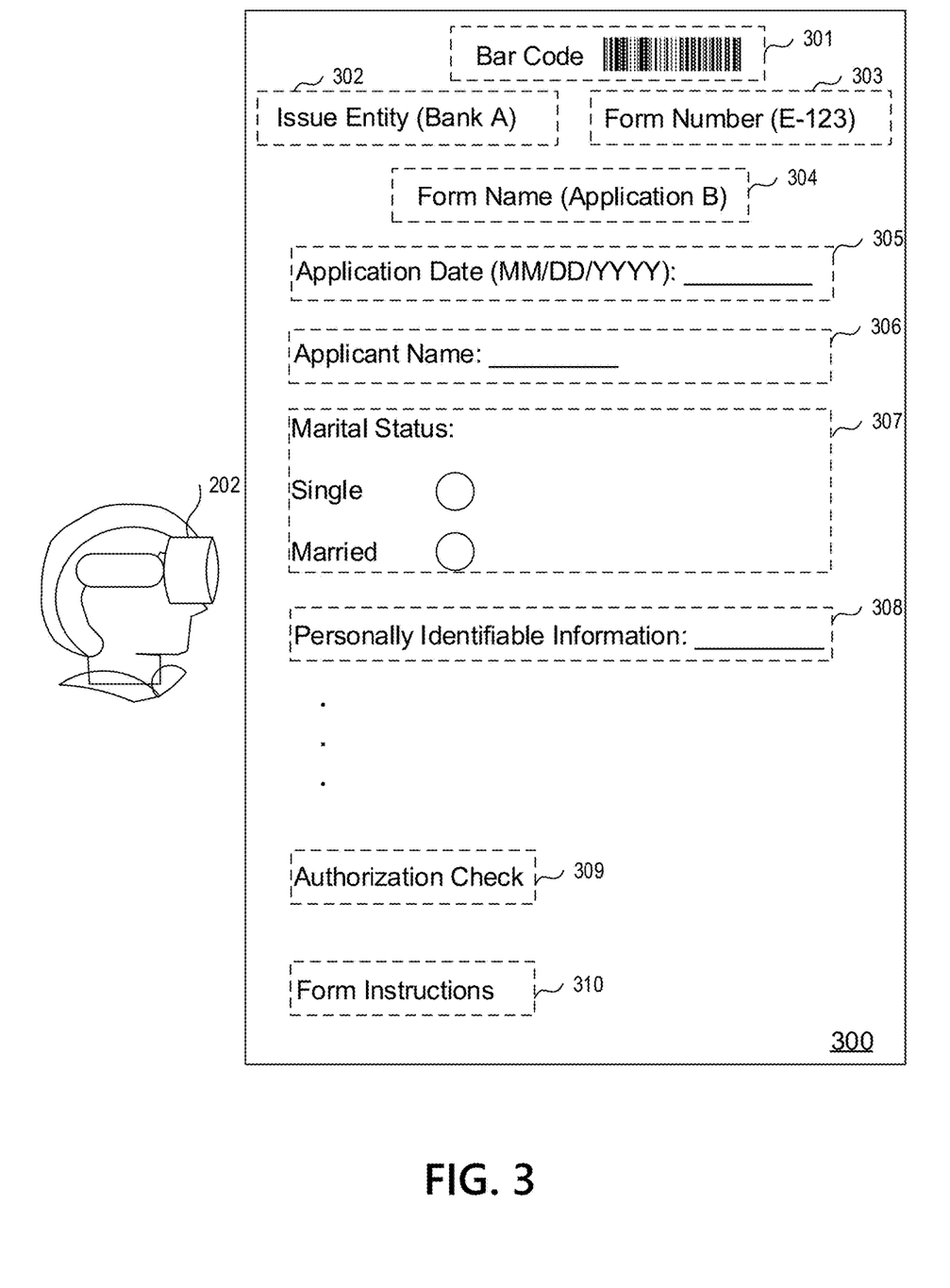
FIG. 3 depicts an illustrative user wearing an illustrative XR device and an illustrative form.

FIG. 3 depicts an illustrative user wearing the XR device 202 and a form 300. Though depicted as a headset in FIG. 3, the XR device 202 may be in other forms such as goggles, small-screen devices, helmets, contact lenses, earphones, etc. The form 300 may comprise a bar code 301, an issue entity 302, a form number 303, a form name 304, one or more form fields such as application date field 305, applicant name field 306, marital status field 307, personally identifiable information (PII) field 308, etc., an authorization check 309, form instructions 310, and other form elements.

The bar code 301 may be a one-dimensional barcode (e.g., UPC-A, EAN 8, Industrial 2 of 5, Codabar, Code 11, Databar, etc.) and/or a two-dimensional barcode (e.g., QR Code, DataMatrix, MaxiCode, Aztec Code, etc.). The bar code 301 generally represents a quick way to retrieve and locate the form 300. The bar code 301 might not be an actual bar code. The bar code 301 may be a general identifier such as an image, a URL link, and the like.

The issue entity 302 may be the entity that issues the form 300. For example, the issue entity 302 may be a government agency, a hospital, a bank, a leasing office, a questionnaire sponsor, and the like. There may be a database of forms for the issue entity 302. Knowing the issue entity 302 may assist in retrieving and locating the form 300.

The form number 303 may be an identifier of the form 300. The form number 303 may comprise a series of alphanumerical characters. The form number 303 may be a unique identifier of the form 300 for each issue entity 302. The form number 303 may be used to retrieve and locate the form 300 in a database, by itself, and/or in combination with other identifiers such as the issue entity 302.

The form fields (e.g., 305-308) may be fields requesting information from a user to achieve a purpose of form-filling. The form 300 may comprise one or more fields that may request non-private information. For example, the form 300 may comprise a filed requesting an application date 305, which may in this context be non-private information. The form 300 may comprise one or more fields that may request information that may be deemed private or non-private based on different criteria. For example, the form 300 may comprise a field requesting an applicant name 306, and/or a marital status 307. The applicant name 306 and marital status 307 fields might be private or public, depending on the nature of the form (e.g., whether it is a medical record, a voter record, etc.). The form 300 may comprise one or more fields that may request private information. For example, the form 300 may comprise a field requesting PII 308. The criteria as for whether the information requested is private or non-private may be determined by a form issue entity (e.g., the federal government), a location (e.g., a hospital) where the form is filled, or other similar considerations.

The authorization check 309 may comprise ways to authenticate a user filling out the form. The authorization check 309 may be a signature field which may be part of the form. For example, the XR device 202 may perform a handwriting validation based on a handwritten signature. The authorization check 309 may comprise other ways which may not be part of the form. These other ways may comprise, e.g., requesting a facial image, requesting an indication (e.g., text message, telephonic call, passcode, etc.) on a different device, and/or requesting an indication (e.g., moving a box) in the XR environment. The authorization check 309 may ascertain that the user is authorized to fill out the form or make changes to the form contents. The authorization check 309 may comprise a request for biometric data associated with the user. The biometric data may comprise one or more of a signature, a fingerprint, a facial image, etc. The authorization check 309 may comprise an indication, from a different device (e.g., a mobile phone) than the XR device 202, that the user is authorized to fill out the form. The indication may comprise one or more of a text message, a telephonic call, a passcode, etc. The authorization check 309 may comprise a second indication of a task, performed by the user, in the XR environment. The second indication of the task may comprise completing one more tasks in the XR environment, such as moving a block from one location to another location, correctly identifying images with a car in them, answering a security question, etc.

The form instructions 310 may comprise one or more instructions to explain to a user what information each field is requesting, and how the information (e.g., format of a date) may be entered. The form instructions 310 may contain information that may be used to retrieve and locate the form 300, by itself and/or in combination with other form elements.

Each form may have a form format that may be exemplified by an ordering of each form element (e.g., 301-310). The form format may alternatively, and/or additionally be used to retrieve and locate the form 300, by itself and/or in combination with other form elements.

The XR device 202 may use any of the elements (e.g., 301-310) of the form to retrieve all or portions of the form 300. The camera 203d of the XR device 202 may capture an entire form (e.g., the form 300). Alternatively, the camera 203d of the XR device 202 may capture one or more form elements (e.g., the bar code 301, the issue entity 302, the form number 303, the form name 304, the form fields 305-308, the authorization check 309, and/or the form instructions 310). The XR device 202 may retrieve all or portions of the form 300 based on the captured form element(s). The form 300 may be determined to be in a specific form format based on the ordering of the form elements. The camera 203d of the XR device 202 may capture all or a portion of the form 300. The XR device 202 may analyze the form format based on the captured all or portion of the form 300. The XR device 202 may then retrieve the form 300 based on the analyzed form format. Whether the camera 203d of the XR device 202 captures the entire form, or the XR device 202 retrieves all or portions of the form, the XR device 202 may present either the entire form to the user in the XR environment, or portions of the form to the user in the XR environment. The virtual reality device might only present fields requesting private information from the user.

The form 300 may be filled out digitally such as using a digital pen, a mouse, a keyboard, a touchscreen, or a voice command receiver. When the form 300 is filled out digitally, the data may be entered by a user on the first computing device 201, the second computing device 204, etc. The data may alternatively, and/or additionally, entered by the user via the display device(s) 203a, the audio device(s) 203b, the input/output 203f, etc., of the XR device 202. If all or portions of the form 300 correspond to a paper form, the form 300 may be filled out physically such as using an ink pen, a ballpoint pen, a pencil, a highlighter, a stencil, or other similar manual input stationaries. Whether the form 300 is filled out digitally or physically, the form contents may be exposed to the public. For example, the public may peek on a device on which the form is being filled out digitally, or the public may peek on a paper form when the form is being filled out using a pen or pencil. Whether the form 300 is filled out digitally or physically, the form contents may be retrieved and restored. For example, when the form 300 is filled out digitally, the form contents may be retrieved by recovering data entry inputs. This may be the case especially during a data breach, where sophisticated measures are taken to retrieve and restore data. When the form 300 is filled out physically (e.g., using a pen or pencil), the form contents may be recognized by following ink traces. Even after the form 300 (e.g., paper form) is destroyed and discarded in garbage, criminals may still retrieve and repair the form and figure out the form contents based on the ink traces.

The form 300 may be filled out in an XR environment. The XR environment may, for example, be provided by the first computing device 201 via the XR device 202. The XR device 202 may display a representation of the form in an XR environment. The representation of the form may be in the same format as the form 300. The representation of the form may be in a different format from the form 300. For example, the representation of the form may be a number of individual form fields in any arrangement which collectively collect all data requested by the form 300. The arrangement of the individual form fields may be randomized After each individual form field is filled out in the XR environment, a next individual form field may be shown. After all individual form fields are filled out in the randomized arrangement, the XR device 202 may generate the entire form in the original order. The randomization may further improve form security because it may be more difficult for data breachers to correspond form contents to randomized form fields. Each individual form field may also be in a different format than its corresponding form field on the form 300. For example, form field 307 requesting a marital status may be represented as two images, one image comprising a single person, another image comprising a couple.

There may be different ways of filling out the form 300 in the XR environment provided by the XR device 202. For example, the user may be instructed to type on a virtual keyboard presented in the XR environment. The user may be instructed to select a box or an image to answer a multiple-choice question. The user may be instructed to make a gesture imitating a check to mark a choice. The form 300 may be filled out by tracing a movement of a gesture or a pen. When all or portions of the form 300 are filled out in the XR environment, the user may wear the XR device 202. The representation of the form 300 might only be accessed by the user wearing the XR device 202. The form contents may not be seen by the public. The form contents may be stored without storing how the form fields are filled out (e.g., not storing the movement of the gesture or the pen). In case of a data breach, it may be more difficult to retrieve, repair, and restore the form contents. The filled content data may be more secure.

Figure 4:
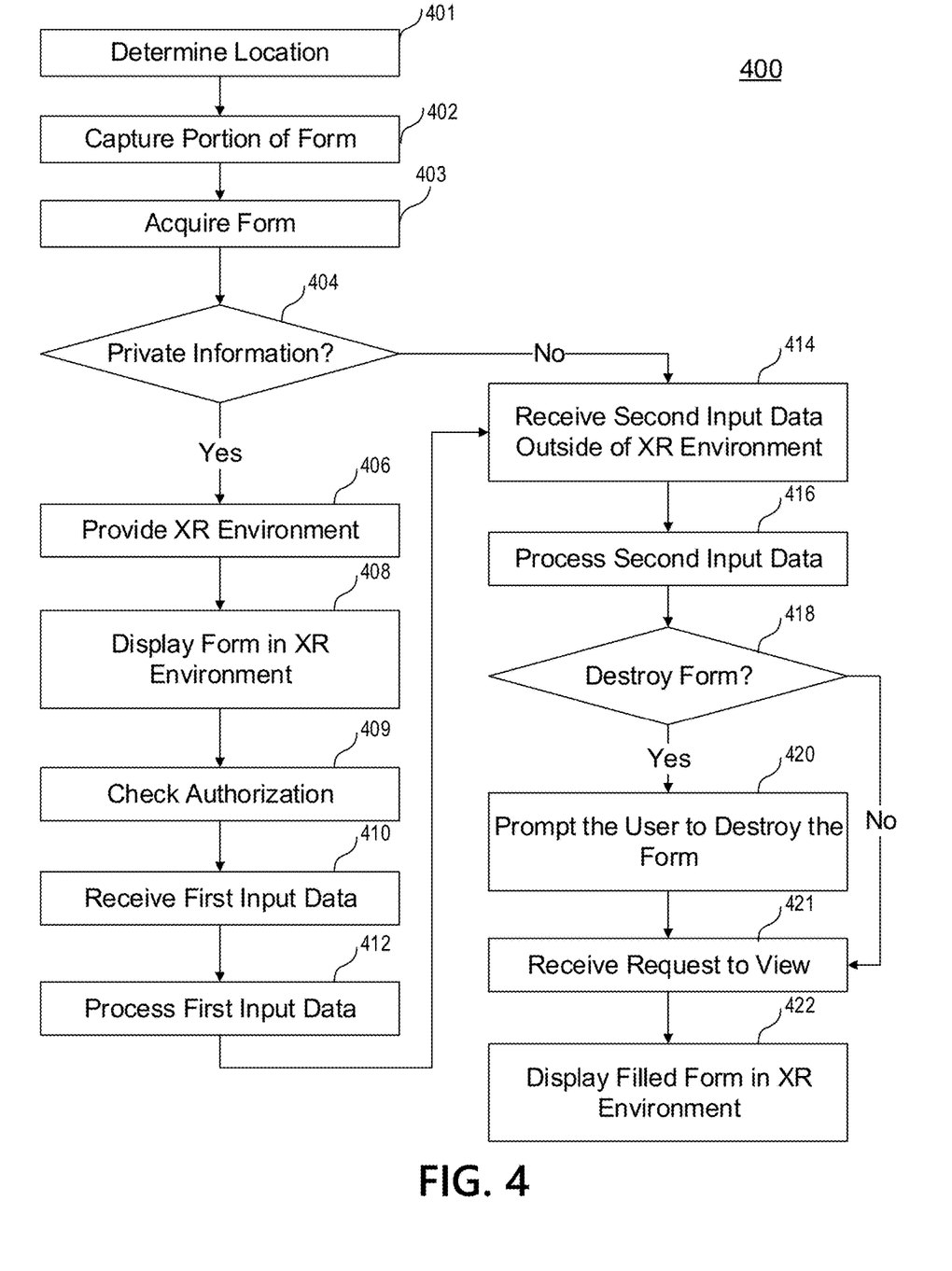
FIG. 4 is a flow chart for a method of separately collecting and storing form contents.

FIG. 4 depicts a method 400 for separately collecting and storing form contents. At step 401, a location of the XR device 202 may be determined. The location of the XR device 202 may be determined based on GPS coordinates of the XR device 202. The location of the XR device 202 may be further determined based on a search history or a navigation request in a map application on a second computing device associated with the XR device 202. The location of the XR device 202 may be further determined based on electronic communications (e.g., a text message of "I am going to the bank") in a messaging application on a second computing device associated with the XR device 202. The location of the virtual reality device may be further determined based on social media posts (e.g., a social media post of "At the hospital. Being sick is terrible!") in a social media application on a second computing device associated with the XR device 202. Retrieving the form 300 may be based on the determined location of the XR device 202. For example, if the XR device 202 is determined to be in a bank, forms associated with the bank may be retrieved. At the bank location, forms associated with the bank may have a higher priority to be retrieved than forms associated with other locations such as a hospital.

At step 402, a portion of a form may be captured. The portion of the form may be captured using a camera of the XR device 202. A camera 203d of the XR device 202 may capture an entire physical form or an entire digital form displayed on a computing device (e.g., a computer, a mobile phone, a touch-screen display, etc.). Alternatively, and/or additionally, the camera 203d of the XR device 202 may capture one or more form elements (e.g., the bar code 301, the issue entity 302, the form number 303, the form name 304, the form fields 305-308, the authorization check 309, and/or the form instructions 310) of the form. A form format may further be determined based on the captured portion of the form.

At step 403, a form (e.g., the form 300) may be acquired. The form may be acquired by an XR device (e.g., the XR device 202). The XR device 202 may retrieve the form from a forms database based on the captured form elements (e.g., the bar code 301, the issue entity 302, the form number 303, the form name 304, the form fields 305-308, the authorization check 309, and/or the form instructions 310). The XR device 202 may further retrieve the form based on the format of the form itself. The acquisition of the form may be based on a determined location of the XR device 202. The location may be determined based on GPS coordinates, search history or navigation request in a map application, electronic communications, social media posts, etc., associated with the XR device 202. Alternatively, and/or additionally, a first computing device (e.g., the first computing device 201) may download, retrieve, and/or locate the form, and then send the form to the XR device 202.

At step 404, the XR device 202 may determine whether private information is requested by one or more form fields of the acquired form. For example, a field requesting an application date, such as the field 305, might not be determined as private information in some occasions. A field requesting PII such as the field 308 may be determined as private information. Some fields such as field 306 requesting applicant name and field 307 requesting marital status may be determined as private information based on some criteria, but may be determined as non-private information based on other criteria. The criteria may be determined by the issue entity 302 (e.g., the federal government, a questionnaire sponsor) or the location (e.g., a hospital, a bank, a leasing office) collecting the form contents. The issue entity 302 and/or the location may have rules, and/or regulations defining what information may be considered private. There may be additionally federal, state, and local laws and regulations governing certain information to be private in some occasions (e.g., voter registration information). These criteria may be stored as a policy at a location in the database storing all the forms for the issue entity 302 and/or the location. As the XR device 202 retrieves the form, the XR device 202 may check each form field against the policy and determine which form field requests private information based on the policy. The policy may be updated to include the up-to-date rules, regulations, and/or laws.

At step 406, if the XR device 202 determines that private information is being requested by one or more fields of the form in step 404, an XR environment may be provided to a user. The XR environment may be provided fully or partially by the first computing device 201. The XR environment may be implemented by the XR device 202. The XR device 202 may be connected to the first computing device 201 via a USB cable, an HDMI cable, an AV cable, etc. Alternatively, and/or additionally, the XR device 202 may be connected to the first computing device 201 via a network, e.g., the Internet. The XR environment may be accessed by the user via the XR device 202, e.g., as a headset.

At step 408, the XR device 202 may display a representation of the form in the XR environment. The entire form or a portion of the form may be displayed. The portion of the form may comprise fields that request private information. The form may be displayed in the XR environment in a way that may facilitate inputting data entries. For example, for a field that requires checking a box, the same field may be displayed as touching one option out of a few options in the XR environment. For example, for a field that requires spelling letters, the same field may be displayed as typing on a virtual keyboard or tracking a gesture spelling the letters in the XR environment. For example, for a field that requires a date, the same filed may be displayed as selecting a date from a calendar with a range of dates in the XR environment. For example, for a field that requires an address, the same field may be displayed as dropping a pin on a map in the XR environment. For yet another example, for a field that requires a marital status, the same field may be displayed as selecting an emoji that represents the marital status.

At step 409, an authorization check may be performed by the XR device 202 to confirm the user is authorized to fill out the form and/or make changes to the form contents. The authorization check may be based on biometric data, an indication from a different computing device (e.g., a mobile phone), and/or an indication of an authorization task performed in the XR environment. The authorization check may comprise a request for biometric data associated with the user. The biometric data may comprise one or more of a signature, a fingerprint, a facial image, etc. The authorization check may comprise an indication, from a different device (e.g., a mobile phone) than the XR device 202, that the user is authorized to fill out the form. The indication may comprise one or more of a text message, a telephonic call, a passcode, etc. The authorization check may comprise a second indication of an authorization task, performed by the user, in the XR environment. The second indication of the authorization task may comprise completing one more tasks in the XR environment, such as moving a block from one location to another location, correctly identifying images with a car in them, answering a security question, etc.

At step 410, the XR device 202 may receive, from the user, data input for the fields displayed at step 408. The data input may be entered via an input method in the XR environment. For each field, the method of entering data input may be different. For example, one field may require touching one option out of a few options presented in the XR environment. Another field may require typing on a virtual keyboard presented in the XR environment. Another field may require tracking a finger or a virtual pen movement such as checking a box presented in the XR environment, writing a word with a finger or a virtual pen on a piece of virtual paper presented in the XR environment, etc. Another field may require selecting a date from a calendar presented in the XR environment. Another field may require dropping a pin on a map presented in the XR environment to indicate an address. Another field may require selecting an emoji from a list of emojis presented in the XR environment. If the user is in a private setting (such as in a private room, or at home), the user may alternatively, and/or additionally, enter the data via voice commands. If the user does not trust the people around them, the XR environment may be accessed only by the user wearing the XR device 202. In this case, the data input entry might not be exposed to bystanders. The data input may be entered and stored according to XR technology providers' security guidelines. Therefore, it may be more difficult for data breachers to retrieve, restore, and/or repair a data input entry. These advantages ensure that the form contents are more secure.

At step 412, the data entered at step 410 may be processed. The data may be processed by the XR device 202. Alternatively, and/or additionally, the data may be processed by the first computing device 201. The data processing may comprise data encryption. The data encryption may be based on various data encryption standards and algorithms such as AES, RSA, TripleDES, etc. The data encryption may further add protection and improve security of the form contents. After the data is encrypted, the data entered at step 410 may be stored in a first database. The first database may be a physical, remote, or cloud-based database. For the data corresponding to private information, there may be a specific security protocol to be incorporated into the data storing in the first database. The data processing may comprise data obscuring. After the data corresponding to private information is stored, that data may be obscured from presentation in the XR environment. Only after receiving a request from the user to view the obscured data, the data may be displayed again on the presentation of the form in the XR environment. Obscuring a portion of or all the form contents may further improve security of the form contents.

At step 414, if the XR device 202 determines that non-private information is being requested by one or more fields of the form, then data input may be entered via a different input method outside of the XR environment. Prior to the data input is entered, an authorization check may be additionally performed by the XR device 202 to confirm the user is authorized to fill out the form and/or make changes to the form contents, similarly as outlined in step 409. If the form is digital, the non-private information may be entered using a digital pen, a mouse, a keyboard, a touchscreen, a voice command receiver, or other digital input devices. The non-private information may be entered via the first computing device 201, a second computing device (e.g., a computer, a mobile phone, a touch-screen display, etc.), and/or the display device(s) 203a, audio device(s) 203b, input/output 203f, etc., associated with the XR device 202. If the form is physical (e.g., printed and on paper), the non-private information may be entered using an ink pen, a ballpoint pen, a pencil, a highlighter, a stencil, or other manual input stationaries. Entering data digitally or physically may run the risk of exposing the data to bystanders. Entering data digitally may result in temporary data that may be retrieved, restored, and/or repaired to obtain the form contents. Enter data physically may enable data breachers to retrieve the form contents based on ink traces, even after the filled form is discarded. For non-private information, the need for data security is not as high as the private information.

At step 416, after the non-private information is entered at step 414, the non-private information data may also be processed by data encryption and/or data obscuring. The data encryption and/or the data obscuring may be performed with similar methods as outlined in step 412. After the data is processed, the data entered at step 414 may be stored in a second database different from the first database. The second database may also be a physical, remote, or cloud-based database. For the data corresponding to non-private information, the specific security protocol to be followed by storing private information data might not need to be incorporated into the data storing in the second database. Collecting the non-private information and private information separately and storing the non-private information and private information in different databases may ensure the security of the form contents. For instance, if the second database of the non-private information is breached, the first database of the private information may still be safe. The first database may require a higher level of security protection than the second database.

At step 418, after both private information is entered in the XR environment at step 410 and non-private information is entered outside of the XR environment at step 414, the user may be asked to choose whether they want the form to be destroyed. The XR device 202 may present a question in the XR environment asking the user whether they want the form to be destroyed. The question asking the user whether they want the form to be destroyed may be alternatively, and/or additionally be displayed on the first computing device 201 screen. The question asking the user whether they want the form to be destroyed may be sent, as a message, to a different computing device (e.g., a mobile phone) associated with the XR device 202 (e.g., signed in with the same user account). If the form is in a physical form (e.g., printed and on paper), the form may comprise a reminder at the bottom of the form to ask the user whether they want the form to be destroyed.

At step 420, if the user chooses to destroy the form, the user may be prompted to destroy the form in different ways. If the form is physical (e.g., printed and on paper), the user may be instructed to destroy it using a shredder. The instructions to destroy the physical form such as using a shredder may be part of the form instructions 310. If the form is digital, the user may be instructed to permanently delete the form. The user may be instructed to delete the form permanently on the first computing device 201 screen. The user may be instructed to destroy the form in the XR environment by dragging the form into an electronic trash can, where the form may be destroyed permanently. The instructions to destroy the digital form may be displayed on the first computing device 201 screen, presented in the XR environment as a sign, and/or presented in the XR environment as a voice instruction via the audio device(s) 203b.

At step 421, a request to view a filled form may be received. The request to view the filled form may be received by the XR device 202. Alternatively, and/or additionally, the request to view the filled form may be received by the first computing device 201, or a different computing device (e.g., a mobile phone) associated with the XR device 202. The request may be to view a filled form, wherein the form was filled completely outside the XR environment. The request may be to view a filled form, wherein the form was filled completely or partially in the XR environment. The XR device 202 may determine which fields of the form were filled in the XR environment, so as to retrieve the form contents for these fields from the first database. The XR device 202 may determine which fields of the form were filled outside the XR environment, so as to retrieve the form contents for these fields from the second database.

At step 422, after receiving a request to view a filled form at step 421, the XR device 202 may display a representation of the form in the XR environment. The XR device 202 may retrieve, from the first database, and overlay the data entry for the private information on the displayed representation of the form. The XR device 202 may further retrieve, from the second database, and overlay the data entry for the non-private information on the displayed representation of the form. The user may view the entire filled form or a portion of the filled form in the XR environment. Alternatively, and/or additionally, all or portions of the data entry may be provided and sent to the XR device 202 by the first computing device 201. Then the XR device 202 may display the representation of the form overlaid with the received data entries.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like, that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. For example, a user may prefer to fill out both private information and non-private information in the XR environment. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:
    capturing, using a camera of a computing device, at least a portion of a form comprising a plurality of fields to be filled out by a user;
    acquiring, by the computing device, from a forms database, and based on the at least the portion of the form, data corresponding to the form;
    providing, by the computing device and to the user, an extended reality (XR) environment;
    displaying, in the XR environment, a representation of the form;
    collecting, from the user during a form-filling occasion, form content requested by the plurality of fields to be filled out by the user at least by:
        receiving, from the user, via a first input method in the XR environment, and based on one or more first fields of the plurality of fields requesting private information, first data indicating the private information requested by at least one of the one or more first fields to be filled out by the user; and
        receiving, from the user, via a second input method outside of the XR environment, and based on one or more second fields of the plurality of fields requesting non-private information, second data indicating the non-private information requested by at least one of the one or more second fields to be filled out by the user;
    storing, based on the first data indicating the private information and using a first security protocol, the first data in a first database; and
    storing, based on the second data indicating the non-private information and using a second security protocol, the second data in a second database.

2. The method of claim 1,
    wherein the at least the portion of the form comprises one or more of:
        a barcode,
        a form name,
        a form number,
        a form format,
        a form field,
        an issue entity, or
        a form instruction, and wherein the acquiring the data corresponding to the form comprises retrieving data corresponding to the form using information associated with the at least the portion of the form to query the forms database.

3. The method of claim 1, wherein the one or more first fields to be filled out by the user are configured for entry of personally identifiable information (PII).

4. The method of claim 1, wherein the first input method comprises one or more of the following:
   typing on a virtual keyboard presented in the XR environment,
   selecting a date from a calendar presented in the XR environment,
   dropping a pin on a map presented in the XR environment,
   selecting an option out of a number of options presented in the XR environment,
   writing on a piece of virtual paper presented in the XR environment, or
   checking a virtual box presented in the XR environment.

5. The method of claim 1, wherein the form corresponds to a paper form, and wherein the second input method comprises use of one or more of: an ink pen, a ballpoint pen, a pencil, a highlighter, a stencil, or other manual input stationaries.

6. The method of claim 1, wherein the form corresponds to a digital form, and wherein the second input method comprises use of one or more of: a digital pen, a mouse, a keyboard, a touchscreen, a voice command receiver, or other digital input devices.

7. The method of claim 1, further comprising:
   determining a location of the computing device, wherein the acquiring the form is further based on the location.

8. The method of claim 1, further comprising:
   determining that the user is authorized to fill out the form based on one or more of:
      biometric data associated with the user;
      a first indication, from another computing device, that the user is authorized to fill out the form; or
      a second indication of an authorization task performed by the user in the XR environment.

9. The method of claim 1,
   wherein the storing the first data in the first database comprises encrypting the first data with a first encryption standard, and
   wherein the storing the second data in the second database comprises storing, without encrypting with the first encryption standard, the second data in the second database.

10. The method of claim 1, further comprising:
    after storing the first data, obscuring, based on the first data corresponding to private information, the first data on the representation of the form.

11. The method of claim 1, further comprising:
    after storing the first data, prompting the user to destroy the form.

12. The method of claim 1, further comprising:
    after receiving, from the user, a request to view the stored first data, displaying the first data on the representation of the form.

13. The method of claim 1, wherein the plurality of fields to be filled out by the user comprises one or more empty fields to be filled out by the user.

14. An apparatus comprising:
    one or more processors; and
    memory storing instructions that, when executed by the one or more processors, cause the apparatus to:
       capture, using a camera of the apparatus, at least a portion of a form comprising a plurality of fields to be filled out by a user;
       acquire, from a forms database, and based on the at least the portion of the form, data corresponding to the form;
       provide, to the user, an extended reality (XR) environment;
       display, in the XR environment, a representation of the form;
       collect, from the user during a form-filling occasion, form content requested by the plurality of fields to be filled out by the user at least by:
          receiving, from the user, via a first input method in the XR environment, and based on one or more first fields of the plurality of fields requesting private information, first data indicating the private information requested by at least one of the one or more first fields to be filled out by the user; and
          receiving, from the user, via a second input method outside of the XR environment, and based on one or more second fields of the plurality of fields requesting non-private information, second data indicating the non-private information requested by at least one of the one or more second fields to be filled out by the user;
       store, based on the first data indicating private information and after encrypting the first data with a first encryption standard, the first data in a first database;
       store, based on the second data indicating non-private information and without encrypting with the first encryption standard, the second data in a second database; and
       prompt the user to destroy the form.

15. The apparatus of claim 14, wherein the first input method comprises one or more of the following:
    typing on a virtual keyboard presented in the XR environment,
    selecting a date from a calendar presented in the XR environment,
    dropping a pin on a map presented in the XR environment,
    selecting an option out of a number of options presented in the XR environment,
    writing on a piece of virtual paper presented in the XR environment, or
    checking a virtual box presented in the XR environment.

16. The apparatus of claim 14, wherein the instructions, when executed by the one or more processors, further cause the apparatus to:
    determine that the user is authorized to fill out the form based on one or more of:
       biometric data associated with the user;
       a first indication, from another computing device, that the user is authorized to fill out the form; or
       a second indication of an authorization task performed by the user in the XR environment.

17. The apparatus of claim 14, wherein the instructions, when executed by the one or more processors, further cause the apparatus to:
    obscure, after storing the first data and based on the first data indicating private information, the first data on the representation of the form; and
    display, after receiving a request from the user to view the stored first data, the first data on the representation of the form.

18. A non-transitory computer-readable medium storing instructions that, when executed by one or more processors, cause the processors to:
- capture, using a camera, at least a portion of a form comprising a plurality of fields to be filled out by a user;
- acquire, from a forms database and based on the at least the portion of the form, data corresponding to the form;
- provide, to the user, an extended reality (XR) environment;
- display, in the XR environment, a representation of the form;
- collect, from the user during a form-filling occasion, for content requested by the plurality of fields to be filled out by the user at least by:
  - receiving, from the user, via a first input method in the XR environment, and based on one or more first fields of the plurality of fields requesting private information, first data indicating the private information requested by at least one of the one or more first fields to be filled out by the user; and
  - receiving, from the user, via a second input method outside of the XR environment, and based on one or more second fields of the plurality of fields requesting non-private information, second data indicating the non-private information requested by at least one of the one or more second fields to be filled out by the user;
- store, based on the first data indicating private information and using a first security protocol, the first data in a first database;
- store, based on the second data indicating non-private information and using a second security protocol, the second data in a second database;
- obscure, based on the first data indicating private information, the first data on the representation of the form; and
- display, after receiving a request from the user to view the stored first data, the first data on the representation of the form.

19. The non-transitory computer-readable medium of claim 18,
wherein the at least the portion of the form comprises one or more of:
- a barcode,
- a form name,
- a form number,
- a form format,
- a form field,
- an issue entity, or
- a form instruction, and wherein the acquiring the data corresponding to the form comprises retrieving data corresponding to the form using information associated with the at least the portion of the form to query the forms database.

20. The non-transitory computer-readable medium of claim 18, wherein the instructions, when executed by the one or more processors further cause the processors to:
determine a location, wherein the acquiring the form is further based on the location.

* * * * *